Patented May 17, 1932

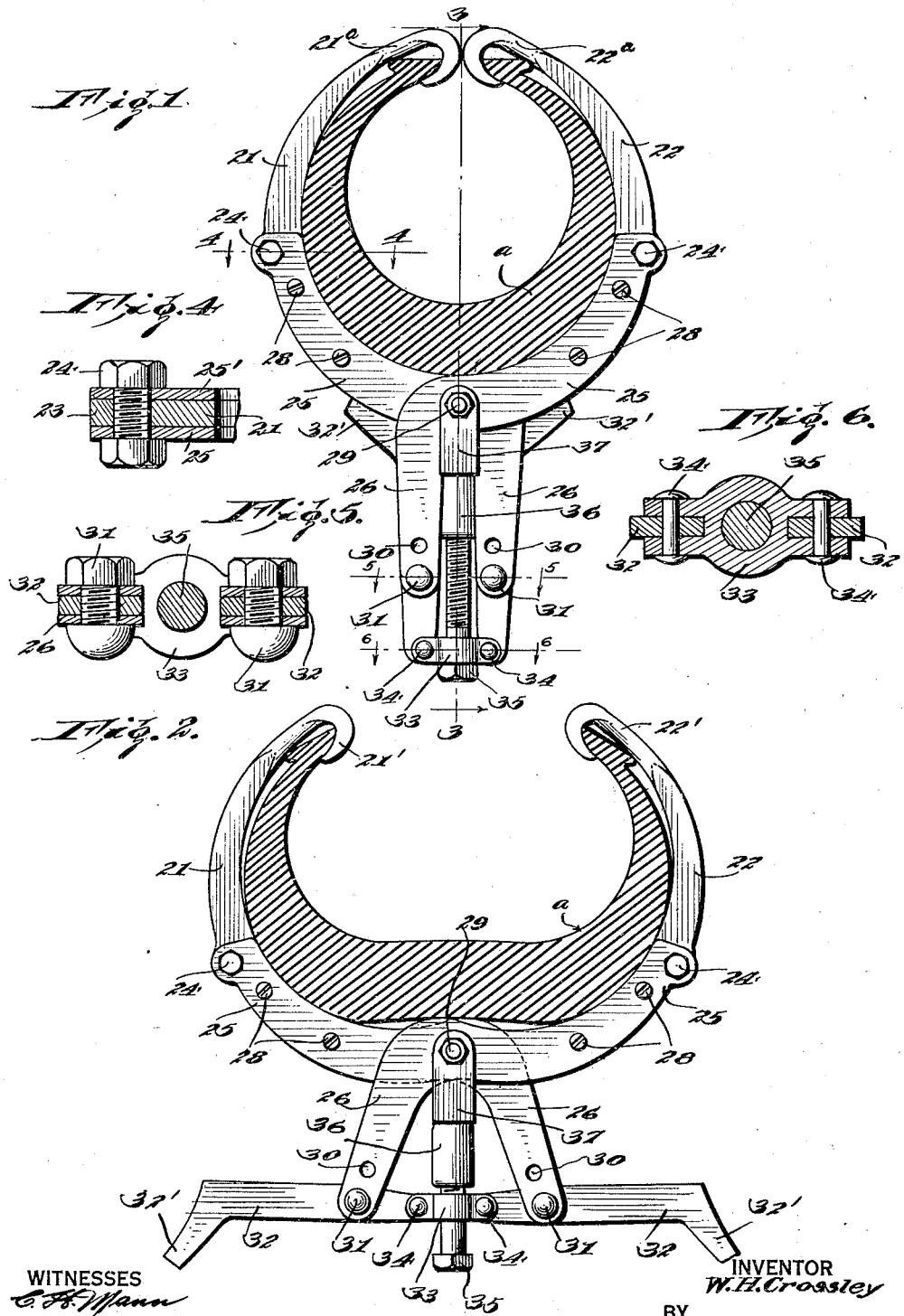

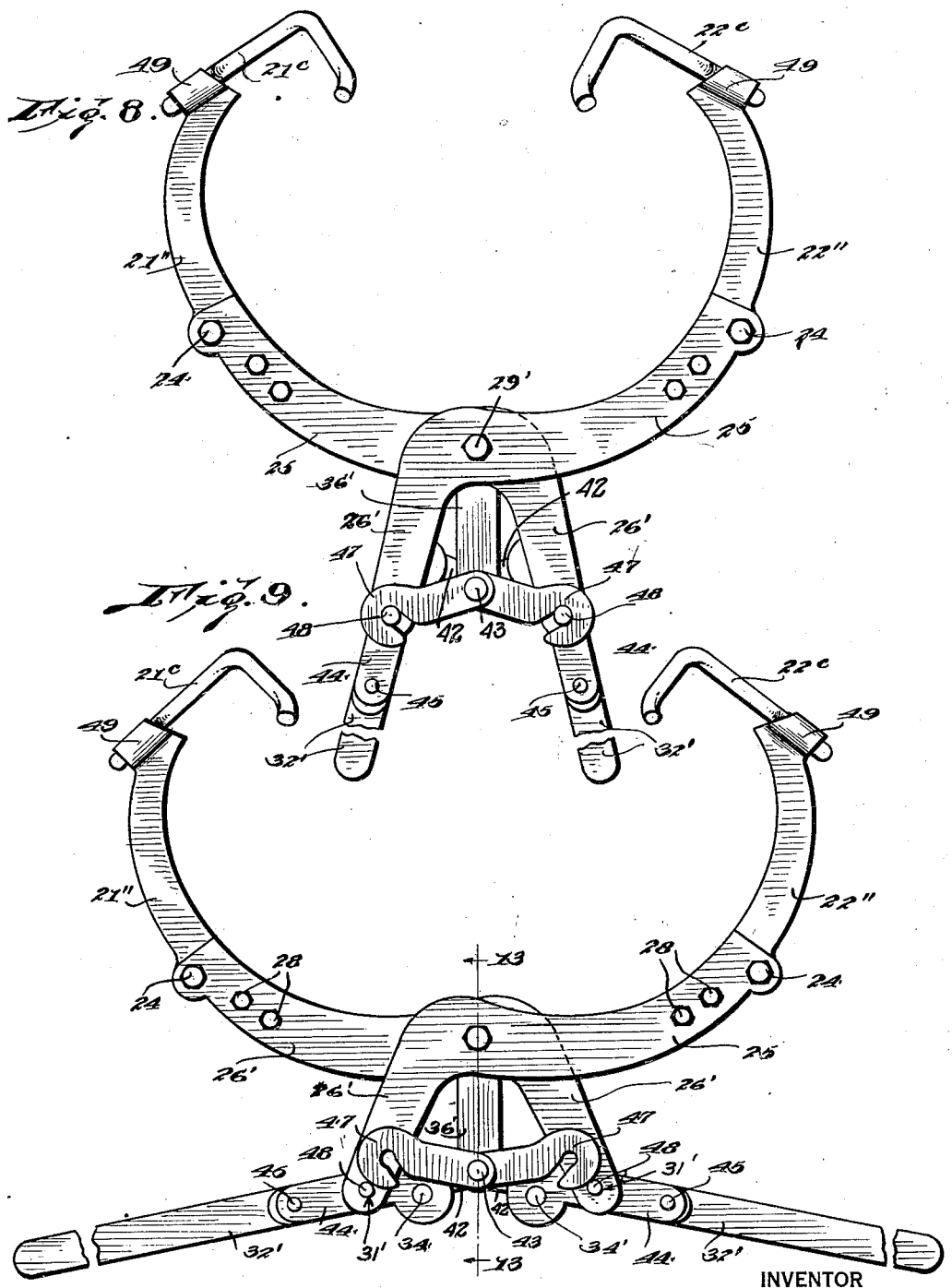

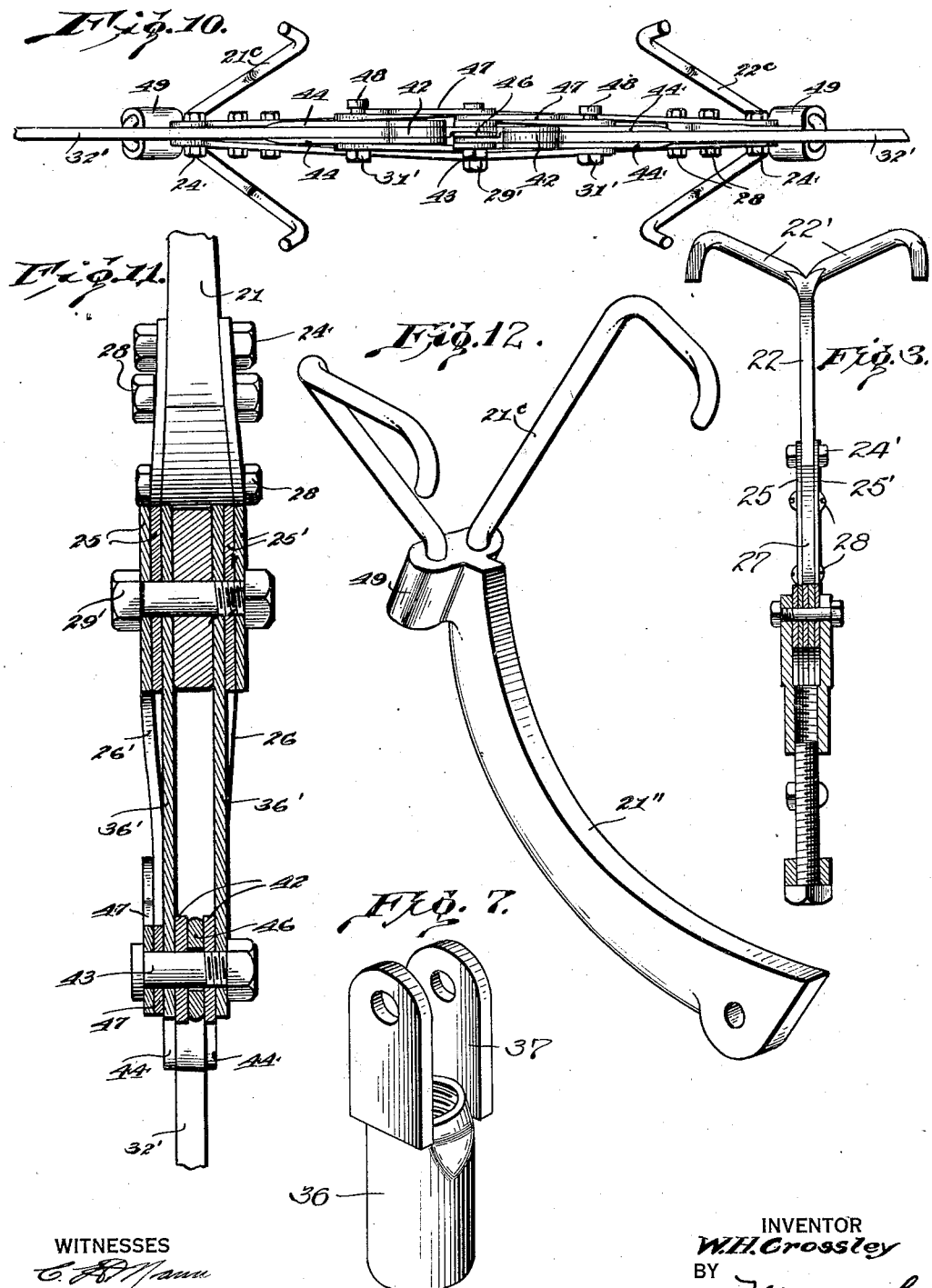

1,859,197

UNITED STATES PATENT OFFICE

WILLIAM H. CROSSLEY, OF KLAMATH FALLS, OREGON, ASSIGNOR OF ONE-HALF TO JAMES R. ELLIFF, OF KLAMATH FALLS, OREGON

AUTOMOBILE TIRE APPLIANCE

Application filed August 26, 1929. Serial No. 388,541.

This invention appertains to improvements in automobile tire appliances generally, and has for its main object to provide a type of the same adapted to facilitate the inspection of the interiors of pneumatic tire casings for the location therein of foreign bodies, breaks or the like during the repair of a tire, by spreading the opposite side walls of a casing and, at the same time, placing the tread portion thereof under an inwardly directed tension, which tension tends to expose to a better advantage any cuts or breaks, or foreign bodies, which might otherwise remain unobserved.

Another object of the invention is to provide an appliance of the class set forth, which is of a comparatively simple and inexpensive construction and arrangement of parts, durable and efficient in design and operation, and capable of performing light and heavy work with equal facility.

With the foregoing and other important objects and advantages in view, the invention resides in the certain new and useful construction, combination and arrangement of parts as will be hereinafter more fully described, set forth in the appended claims, and illustrated in the accompanying drawings, in which:

Figure 1 is a vertical transverse section through a pneumatic tire casing, showing a practical embodiment of one form of the invention as initially applied thereto, the latter being in side elevation;

Figure 2 is a view similar to that of Figure 1, showing the appliance as it appears when operated;

Figure 3 is a vertical section, taken on the line 3—3 of Figure 1;

Figure 4 is a horizontal section, taken on the line 4—4 of Figure 1;

Figures 5 and 6 are views similar to that of Figure 4, but taken on the lines 5—5 and 6—6 respectively of Figure 1;

Figure 7 is an enlarged perspective view of the sleeve or socket forming a part of the actuating means of the appliance;

Figure 8 is a side elevation of a further modification of the appliance of the device, showing the device as it appears with its jaws set in position of readiness of application to a tire casing;

Figure 9 is a view similar to that of Figure 8 but showing the device in spread position;

Figure 10 is a bottom plan view of the latter form of the device;

Figure 11 is a vertical section, taken on the line 13—13 of Figure 11; and

Figure 12 is a perspective view of one of the jaws.

Referring to the drawings wherein like characters of reference designate corresponding parts in the several corelated views thereof, the embodiment of the invention, as shown in Figures 1 to 7, inclusive, by way of example, comprises a pair of oppositely curved jaw members 21 and 22, which are forked at their upper ends to provide pairs of angularly and oppositely offset hook portions $21^a$ and $22^a$, respectively. The lower ends of the jaws 21 and 22 are each provided with outwardly offset portions 23 (Figure 4), which are apertured for pivotal engagement on bolts or the like 24 secured in alined apertures formed in similarly offset portions carried at the upper ends and outer sides of the oppositely arranged parts 25 and 25' (Figure 4) of companion jaw levers 26.

The oppositely arranged parts 25 and 25', of each of the jaw levers 26, are spaced apart in parallel relation by an elongated piece of flat metal 27 (Figure 3), positioned between the upper portions of the parts, when they are secured together therewith by means of screws or the like 28. The upper portions of the levers 26 are each upwardly and outwardly curved, while the lower portions thereof are angular offset and substantially straight, the spacer members 27 being preferably secured between the upper curved portions and inwardly from the opposite ends thereof, with the upper ends of the same terminating below the pivots 24 for cooperation with the lower ends of the jaws 21 and 22 to limit the inward movements of the latter to positions in line with the upper ends of the lever portions 26.

The lower ends of the curved portions of the levers 26 are arranged in cross overlapping relation, substantially as shown, and are pivoted together in that condition by means of a bolt or the like 29, while the lower parallel portions thereof are each provided with pairs of apertures 30 to receive in either of the same a pivot bolt or the like 31 by means of which they are attached to companion actuating arms or hand levers 32. These arms 32 are disposed in alinement at the opposite sides of a collar 33, to which the adjacent ends of the arms are pivoted, as at 34. The collar 33 is loosely mounted on a bolt or screw 35, which is vertically adjustable in the lower end of a sleeve or socket 36, the latter having its upper end bifurcated, as at 37, to straddle the overlapping portions of the jaw levers 26 to which it is pivoted by the main pivot bolt 29.

The actuating arms 32 are preferably arranged to extend upwardly in substantially parallel relation and within the spaces between the opposite portions 25 and 25' of the straight depending portions of the levers 26, when the jaw portions 21 and 22 are disposed in their initial tire casing engaging position, as in Figure 1. The outer ends of the arms 32 are preferably formed to provide angularly offset portions 32', to form finger pieces, which are curved at their outer side edges so as to closely underlie the lower sides of the upper curved portions of the levers 26, when the arms 32 are disposed in vertical position.

In the operation of this form of the invention, and with the parts thereof as illustrated in Figure 1, the oppositely hooked portions 21ª and 22ª of the jaws 21 and 22 are to be readily engaged over the beaded edges of the inner circumferential split of the tire casing a, when the casing is seated within the semi-curvature of the upper portions of the levers 26. After the jaws 21 and 22 are so engaged, the same, together with the levers 26 are to be forced apart by the operator grasping the outer ends of the arms 32 at the finger pieces 32' and pulling the arms outwardly and downwardly into substantially horizontally alined position. When the parts of the device are spread to fully extended position, the collar 33 will have moved upwardly of the bolt or screw 35 and into abutting relation with the lower end of the sleeve or socket 36 and thereby acts to prevent any further movement of the parts. With the jaws 21 and 22 disposed in spread position, as shown in Figure 2, the opposite side walls of the tire casing are also spread apart and at a distance one from the other so as to allow full inspection of the interior of the casing. Also, with the parts in this position, the angular portions of the levers 26, adjacent the pivot 29, act to force or bulge the tread portion of the casing a slightly upward, which places the same under a tension so that any injurious bodies embedded in the surface of the casing, or any breaks or cuts therein will be instantly detected.

By adjusting the pivot bolts 31 so that they pass through the correct apertures 30, the levers 26 and the arms 32 may be adjusted or set for use with tire casings of various sizes, so that the arms 32 will always swing to substantially horizontally alined or dead center position regardless of the size of the casings to be inspected. In the handling of extremely heavy duty tire casings, the jaws 21 and 22, together with the levers 26 and the arms 32, may be forced to spread position in a comparatively easy manner by applying a wrench to the lower headed end of the bolt or screw 35, so that the collar 33 will be moved with great force upwardly toward the lower end of the sleeve or socket 36 for the purpose.

Referring now to Figures 8 to 12 inclusive, and in the modified form of the invention therein shown, the overlapped portions of the jaw levers 26' are pivoted together, as at 29', and have their lower extremities pivoted, as at 31', to the hand levers 32' after the manner of the same as in the first instance of the device. The hand levers 32' are similarly pivoted at their inner ends, as at 34', to the complemental of the ends of a pair of link members 42 which, in turn, have their other ends commonly pivoted, as at 43, to and between the lower ends of a pair of link members 36' depending from the main pivot 29'.

The hand levers 32' are in the nature of lengths of flat bar iron or the like, and each preferably have a pair of metal plates 44 secured at the opposite sides of their inner end portions, as by means of rivets or the like 45, to provide an extension forming a bifurcation between the same to engage over the adjacent portions of the link members 42 having the portions thereof, which are engaged in the bifurcations of the extensions 44 of the hand levers 32' of a thickness equal or substantially equal to that of the latter, and their inner overlapping end portions engaged on the pivot 43 of a reduced thickness to receive between the same a spacing collar or washer 46. In this manner, the supporting links 36' are parallel one with respect to the other and there will be no binding between the same, the link members 42 and the washer 46.

Mounted on the pivot 43 at the outer side of one of the supporting links 36' are a pair of oppositely extending hook members 47, which are arranged in a manner to have their outer hooked ends engaged over studs 48, formed on the adjacent ends of the pivot bolt 31' which are employed to attach the lower ends of the jaw levers 26' to the hand levers 32', to lock the parts of the structure when the latter are disposed in their normal or tire casing engaging position, as illustrated in Figure 8. Thus, the spreader device may be retained in a position for readiness for application to a tire casing, and against accidental movement to spread position while being transported from one point of use to another.

In this instance of the invention, the jaws 21″ and 22″ are each provided with enlarged free end portions 48, upwardly through which a pair of parallel bores or openings are formed to receive the opposite legs of the complemental of the jaw members or pieces 21c and 22c, the latter being each formed of a suitable length of metal wire or rod and first bent at the middle thereof to substantially U-form for the passage of the opposite legs thereof upwardly through the bores or openings aforesaid in the enlargements 48. After being engaged in the enlargements 48 the legs of the jaw members 21c and 22c are each then angularly bent in opposite directions and thereafter again angularly bent to form parallel hook portions at their free ends.

In this modified form of the invention, the jaws 21″ and 22″ are pivoted at 24 to the upper ends of the parts 25 of the jaw levers 26′ in the manner of the other forms of the device and the hook portions of the jaw members or pieces 21c and 22c are to be engaged over the adjacent edges of a tire casing when the device is contracted or collapsed. A tire casing will be spread adjacent the points of connection therewith of the jaw members or pieces 21c and 22c, when the spread device is expanded by the proper actuation of the hand levers 32′, which spread position of the device is clearly illustrated in Figure 9.

Without further description it is thought that the features and advantages of the invention will be readily apparent to those skilled in the art, and it will of course be understood that changes in the form, proportion and minor details of construction may be resorted to without departing from the spirit of the invention or its scope as claimed.

I claim:

1. A tire casing spreader comprising a pair of oppositely arranged tire bead engaging jaws, crossed levers pivotally connected together at their points of crossing and at one of their ends to the inner ends of said jaws, oppositely movable arms pivotally connected intermediate of their ends to the other ends of said crossed levers, a member depending at an end thereof from the pivot at the point of crossing of said crossed levers and between the said other ends thereof and a cross member carried by said first named member and slidable thereon, said cross member pivotally connecting adjacent ends of said arms together whereby the latter operate simultaneously to actuate the ends of said levers and said jaws to and from spread position when the free ends of said arms are moved in opposite directions.

2. A tire casing spreader comprising a pair of oppositely arranged tire bead engaging jaws, crossed levers pivotally connected together at their points of crossing and at one of their ends to the inner ends of said jaws, oppositely movable arms pivotally connected intermediate of their ends to the other ends of said crossed levers, a socket depending from the pivot at the point of crossing of said levers and between the said other ends thereof, a screw member adjustable vertically of said socket and a collar slidable on said screw member and pivotally connecting adjacent ends of said arms together whereby the latter operate simultaneously to actuate the ends of said levers and said jaws to and from spread position when the free ends of said arms are moved in opposite directions, said screw member being operable to force said collar in the direction of said socket whereby to operate said arms.

3. A tire spreader comprising crossed levers pivotally connected together at their point of crossing, oppositely disposed tire bead engaging jaws carried by one end of said levers, oppositely movable normally substantially parallel arms pivoted intermediate of their ends to the other ends of said crossed levers and means pivotally connecting two adjacent ends of said arms together whereby the ends of said crossed levers will be spread apart when the other ends of said arms are moved in opposite directions.

4. A tire casing spreader including a pair of crossed levers pivoted together at their point of crossing, one end of each of said levers terminating in a tire bead engaging jaw, oppositely movable arms pivotally connected intermediate of their ends to the other ends of said crossed levers, a member depending at an end thereof from the pivot at the point of crossing of said crossed levers and between the said other ends thereof, and a link pivotally connecting adjacent ends of said arm to said depending member.

WILLIAM H. CROSSLEY.